(12) United States Patent
Diesendruck et al.

(10) Patent No.: US 11,748,973 B2
(45) Date of Patent: Sep. 5, 2023

(54) SYSTEMS AND METHODS FOR GENERATING OBJECT STATE DISTRIBUTIONS USABLE FOR IMAGE COMPARISON TASKS

(71) Applicant: Microsoft Technology Licensing, LLC, Redmond, WA (US)

(72) Inventors: Maurice Diesendruck, Bellevue, WA (US); Robin Abraham, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/554,718

(22) Filed: Dec. 17, 2021

(65) Prior Publication Data
US 2023/0196723 A1    Jun. 22, 2023

(51) Int. Cl.
G06K 9/32 (2006.01)
G06V 10/74 (2022.01)
G06V 10/764 (2022.01)
G06T 7/11 (2017.01)

(52) U.S. Cl.
CPC .............. *G06V 10/761* (2022.01); *G06T 7/11* (2017.01); *G06V 10/764* (2022.01); *G06T 2200/24* (2013.01); *G06T 2207/20092* (2013.01)

(58) Field of Classification Search
CPC .. G06V 10/761; G06V 10/764; G06V 30/416; G06T 7/11; G06T 2200/24; G06T 2207/20092; G06T 3/0093
USPC ................................................. 382/103, 197
See application file for complete search history.

(56) References Cited

U.S. PATENT DOCUMENTS

| | | | |
|---|---|---|---|
| 2011/0091113 A1* | 4/2011 | Ito .......................... | G06T 3/0093 382/197 |
| 2014/0270349 A1* | 9/2014 | Amtrup ................ | G06V 30/416 382/103 |
| 2016/0042253 A1 | 2/2016 | Sawhney et al. | |

OTHER PUBLICATIONS

"International Search Report and Written Opinion issued in PCT Application No. PCT/US22/052065", dated Apr. 17, 2023, 12 Pages.

* cited by examiner

*Primary Examiner* — Abdul-Samad A Adediran
(74) *Attorney, Agent, or Firm* — WORKMAN NYDEGGER

(57) ABSTRACT

A system for generating object state distributions receives an image set and generates a set of object type classifications. The set of object type classifications includes an object type classification for one or more objects represented in the image set. The set of object type classifications is generated by utilizing the image set as input to one or more object detection modules. The system generates an object state vector for each object type classification of the set of object type classifications. The object state vector(s) is/are generated by utilizing (i) the set of object type classifications and (ii) a set of image information based on the image set as input to one or more object state description modules. The system defines an object state distribution based on collections of the object state vectors.

20 Claims, 15 Drawing Sheets

SYSTEMS AND METHODS FOR GENERATING OBJECT STATE DISTRIBUTIONS USABLE FOR IMAGE COMPARISON TASKS

BACKGROUND

Existing image or video retrieval techniques include receiving search terms and searching for images and/or video within an image index that are associated with tags that are relevant to the search terms. Such techniques provide users with limited control over the search query and with limited control over the manner in which the search is performed.

Accordingly, there exists a substantial need for improved image comparison and/or retrieval techniques.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed at least to object state distributions for image comparison, and to systems and methods for defining/utilizing object state distributions.

Some embodiments include a system for generating an object state distribution. The system includes one or more processors and one or more hardware storage devices storing instructions that are executable by the one or more processors to configure the system to perform various acts.

In some implementations, the system is configured to receive an image set, which may include one or more images. The system is also configured to generate a set of object type classifications. The set of object type classifications includes an object type classification for one or more objects represented in the image set. The set of object type classifications is generated by utilizing the image set as input to one or more object detection modules. The set of object type classifications is based on output of the one or more object detection modules. The system is configured to generate an object state vector for each object type classification of the set of object type classifications. The object state vector(s) is/are generated by utilizing (i) the set of object type classifications and (ii) a set of image information based on the image set as input to one or more object state description modules. Each of the object state vectors comprises a respective embedding generated by the one or more object state description modules. The system is further configured to define an object state distribution. The object state distribution includes each of the object state vectors for each object type classification of the set of object type classifications.

In some implementations, the system is configured to present one or more images within a graphical user interface and receive user input directed to one or more objects represented within the one or more images. The system is also configured to generate an object state vector for each of the one or more objects. The object state vectors are generated by utilizing (i) a set of object type classifications comprising an object type classification for each of the one or more objects and (ii) a set of image information based on the one or more images as input to one or more object state description modules. Each of the object state vectors comprises a respective embedding generated by the one or more object state description modules. The system is further configured to define an object state distribution for the one or more objects. The object state distribution comprises each of the object state vectors for each of the one or more objects.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
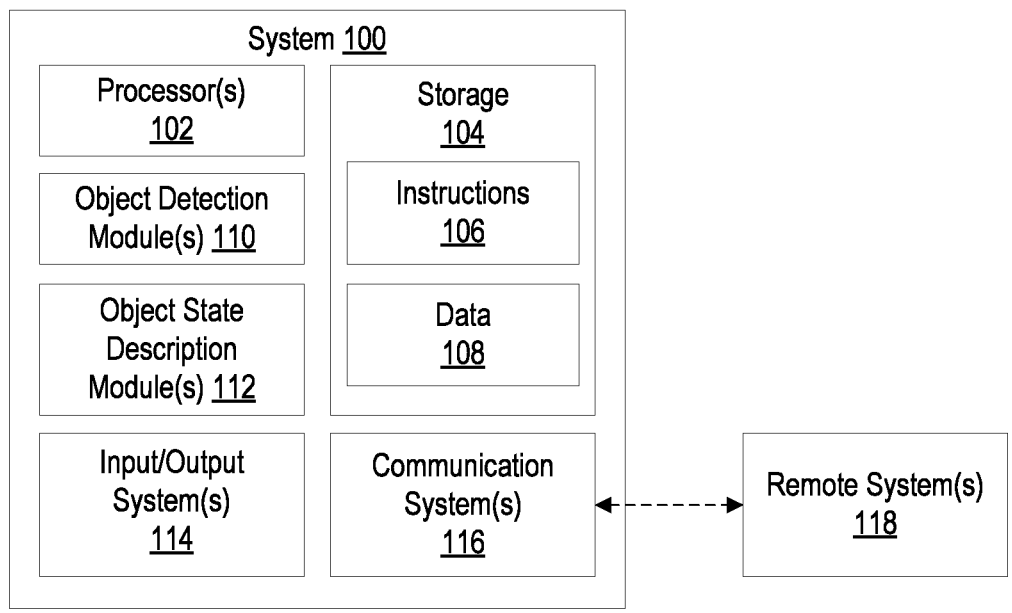
FIG. 1 illustrates example components of an example system that may include or be used to implement one or more disclosed embodiments.

Disclosed embodiments are generally directed at least to object state distributions for image comparison, and to systems and methods for defining/utilizing object state distributions.

Examples of Technical Benefits, Improvements, and Practical Applications

Those skilled in the art will recognize, in view of the present disclosure, that at least some of the disclosed embodiments may be implemented to provide improved image comparison and/or retrieval techniques. The following section outlines some example improvements and/or practical applications provided by the disclosed embodiments. It will be appreciated, however, that the following are examples only and that the embodiments described herein are in no way limited to the example improvements discussed herein.

As indicated above, existing image retrieval techniques rely on comparing tags associated with an image search query (e.g., text input, or tags obtained based on image input) to tags associated with images in an image index. Image and video models have been developed that are effective in identifying scenes and objects in image and video, and such models can be utilized in the image indexing process (e.g., to define tags for images in the index) and/or in the image search process (e.g., where a search query includes image input, to obtain tags for the image input to compare with tags in the index).

Notwithstanding, existing techniques provide users with limited control over image search queries and over the manner in which the search is performed. For example, a user may be interested in a specific aspect of a query image, such as one or more states of one or more objects represented in the query image. Existing approaches fail to tailor search queries to the context of scenes/objects captured in query images.

At least some implementations of the present disclosure are directed to defining an object state distribution for image set input. The object state distribution may be defined based on object state vectors generated for objects represented in the image set input. For instance, object classifications for the objects and image information from the image set may be provided to one or more object state description modules, and the object state vectors may comprise embeddings generated by the one or more object state description modules. The object state distribution may be defined as the collection of the object state vectors (e.g., within a single matrix).

The object state distribution may thus provide a representation of object states of image set input in continuous numerical space (e.g., rather than discrete classifications). Object state distributions may be obtained for images in an image index, and one or more query object state distributions may be obtained for a set of one or more query images. Distances may be computed between the query object state distribution(s) and the indexed object state distributions for the images in the index. Similarity or relevance of the images in the index to the query image(s) may be determined based on the distance measures between the query object state distribution(s) and the corresponding indexed object state distributions for the indexed images.

In this way, image retrieval may be performed in a manner that allows for consideration of the state(s) of the object(s) represented in the query image, thereby facilitating more granular control over the search query and the manner in which the search is performed. For example, users may select one or more object types, which may lead to the definition of a set of object states usable as a search query, or users may select one or more object instances, which may lead to the definition of a set of object states usable as a search query. Users may additionally or alternatively select state type(s) if multiple are available (e.g., pose, emotion, etc.).

Aside from image search/retrieval, object state distributions for images may be utilized in many other contexts. For example, object state distributions may be implemented to perform video summarization, such as to identify changepoints in videos (e.g., where object state distributions change significantly from one video frame (or subset of video frames) to the next) and/or moments of interest in videos (e.g., where object state distributions for particular objects change significantly from one video frame (or subset of video frames) to the next). Object state distributions may even be applied to define policy-compliant states and/or to detect compliance with or deviation from the policy-compliant states.

At least some disclosed embodiments are directed to user interface elements for facilitating intuitive image/video search/retrieval using object state distributions.

The disclosed embodiments may be utilized with any types of imagery or visual content, such as, by way of non-limiting example, color imagery, grayscale imagery, depth imagery, 3D models, extended reality content/scenes, spectral imagery, and/or others.

Having just described some of the various high-level features and benefits of the disclosed embodiments, attention will now be directed to FIGS. 1 through 9. These Figures illustrate various conceptual representations, architectures, methods, and supporting illustrations related to the disclosed embodiments. Also, with regard to referenced systems that are "configurable to" perform certain functionality, it will be appreciated that such references should also be interpreted to cover corresponding systems that are completely configured to perform the referenced functionality, as well as systems that actively perform the referenced functionality.

Example Systems

Attention is now directed to FIG. 1, which illustrates an example system 100 that may include or be used to implement one or more disclosed embodiments. In some instances, the system 100 is implemented as one or more general-purpose or special purpose computing systems, which may take on a variety of forms.

FIG. 1 illustrates various example components of the system 100. For example, FIG. 1 illustrates an implementation in which the system includes processor(s) 102, storage 104, input/output system(s) 114 (I/O system(s) 114), and communication system(s) 116. FIG. 1 also illustrates that a system may include or be used to implement various modules, including object detection module(s) 110 and object state description module(s). Although FIG. 1 illustrates a system 100 as including particular components, one will appreciate, in view of the present disclosure, that a system 100 may comprise any number of additional or alternative components.

As used herein, the terms "executable module," "executable component," "component," "module," or "engine" can refer to any combination of hardware components or software objects, routines, or methods that may configure a computer system 100 to carry out certain acts. For instance, the different components, modules, engines, devices, and/or services described herein may be implemented utilizing one or more objects or processors that execute on computer system 100 (e.g., as separate threads). While FIG. 1 depicts independent modules 110 and 112, one will understand the characterization of a module is at least somewhat arbitrary. In at least one implementation, the various modules 110 and 112 (and/or others discussed herein) may be combined, divided, or excluded in configurations other than that which is shown. For example, any of the functions described herein with reference to any particular module 110 or 112 may be performed utilizing any number and/or combination of processing units, software objects, modules, instructions, computing centers (e.g., computing centers that are remote to computing system 100), etcetera. As used herein, the individual modules 110 and 112 are provided for the sake of clarity and explanation and are not intended to be limiting.

The processor(s) 102 may comprise one or more sets of electronic circuitry that include any number of logic units, registers, and/or control units to facilitate the execution of computer-readable instructions (e.g., instructions that form a computer program). Such computer-readable instructions may be stored within storage 104. The storage 104 may comprise physical system memory (e.g., one or more hardware storage devices) and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 and/or modules 110, 112 described herein may comprise or be configurable to execute any combination of software and/or hardware components that are operable to facilitate processing using machine learning models or other artificial intelligence-based structures/architectures that are integrated into and/or that comprise the referenced modules.

By way of example, processor(s) 102 and/or modules 110 and/or 112 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, transformer models, combinations thereof, and/or others.

As will be described in more detail, the processor(s) 102 and/or modules 110, 112 may be configured to execute instructions 106 stored within storage 104 to perform certain actions associated with generating and/or utilizing object state distributions. For instance, such actions may be associated with detecting objects and/or object types present within image data (e.g., via processor(s) 102 and/or object detection module(s) 110), generating continuous numerical representations of object states (e.g., via processor(s) 102 and/or object state description module(s) 112), etc.

In addition, the processor(s) 102 and/or modules 110, 112 may be configured to perform actions associated with training or configuring the modules 110, 112 to perform any functionality described herein. The actions performable by the processor(s) 102 and/or modules 110, 112 may at least partially rely on various types of data 108. For instance, any of the modules 110, 112 114, 116, 118, 120, and 122 described herein may be trained to perform detection, recognition, segmentation, description, analysis, and/or other tasks using various types of training data (e.g., domain-specific training data, cross-domain, and/or multi-domain data) and using various types of training techniques (e.g., fully supervised, weakly supervised, and/or unsupervised).

In some instances, the actions performable using the processor(s) 102 and/or modules 110, 112 may rely at least in part on communication system(s) 116 for receiving data from remote system(s) 118, which may include, for example, one or more separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others. For example, implementations of the present disclosure may be practiced using cloud computing.

As shown, FIG. 1 also illustrates that system 100 may comprise or be in communication with I/O system(s) 114. I/O system(s) 114 may include any type of input or output device such as, by way of non-limiting example, a touch screen, a mouse, a keyboard, a controller, and/or others, without limitation.

Example Techniques for Implementing Object State Distributions

Figure 2A:
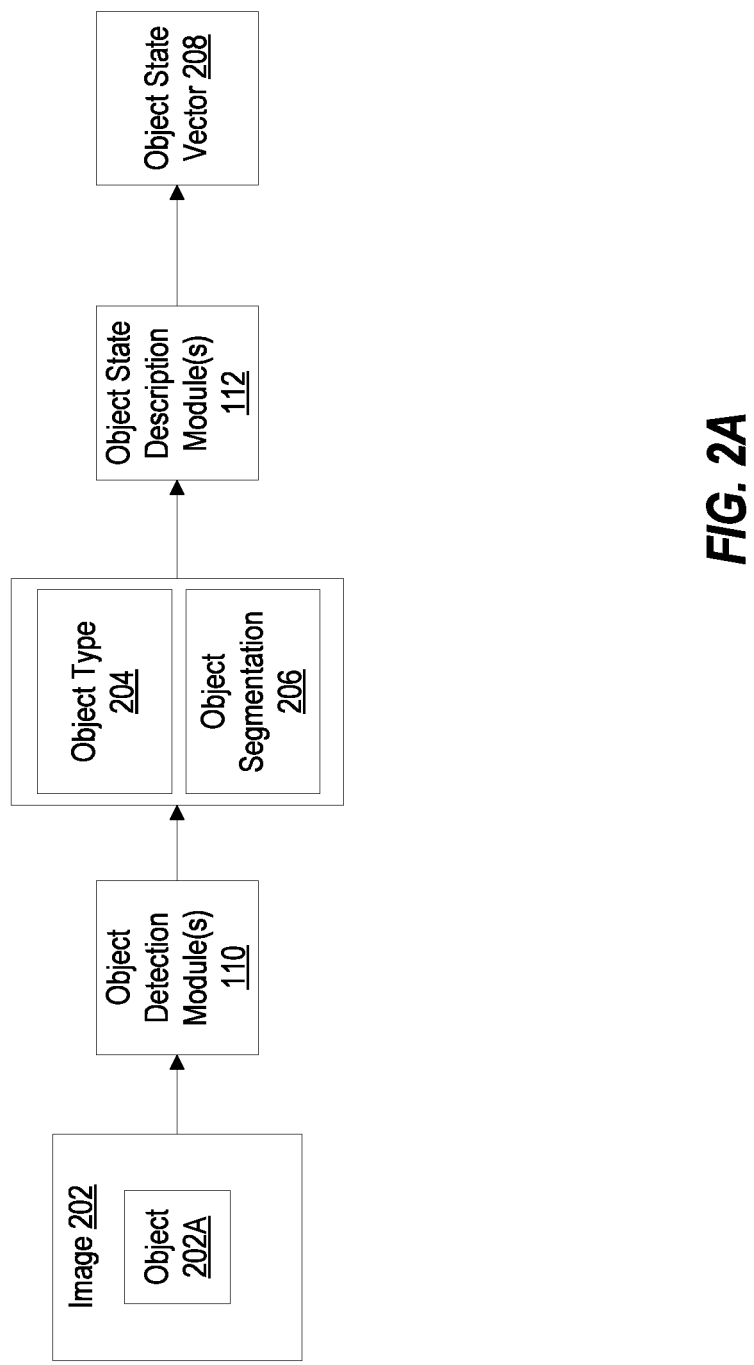
FIGS. 2A and 2B illustrate schematic representations of obtaining an object state distribution based on input imagery.

FIG. 2A illustrates a schematic representation of obtaining an object state distribution based on input imagery. In particular, FIG. 2A illustrates an image 202 that depicts an object 202A. The principles disclosed herein are not limited to any particular image type or format or to any particular type of objects.

FIG. 2A illustrates the image 202 being provided as input to the object detection module(s) 110 discussed hereinabove. The object detection module(s) 110 is/are configured to receive image data as input and to output labels based on the input image data. In the example of FIG. 2A, the labels comprise object type 204 and object segmentation 206. The object type 204 may comprise a discrete classification of a type for the object 202A represented in the image 202 that was input to the object detection module(s) 110. For example, if the real-world object 202A captured or represented in the image 202 is a dog, the object type 204 classification may include a label of "dog". The object segmentation 206 may comprise a definition of the region of image data within the image 202 that depicts the object 202A. Although FIG. 2A illustrates both object type 204 and object segmentation determined by the object detection module(s) 110, the object detection module(s) 110 may be configured to determine fewer or additional labels in some implementations.

The object detection module(s) 110 may be trained in various ways and/or take on various forms to facilitate assignment of labels such as object type 204 and/or object segmentation 206 for the object 202A represented in the input image 202. For example, the object detection module(s) 110 may comprise or utilize one or more of regional proposals, single shot multi-box detection, single-shot refinement neural network for object detection, retina-net, deformable convolutional networks, Viola-Jones object detection based on Haar features, scale-invariant feature transform, histogram of oriented gradients features, thresholding, clustering, motion segmentation, compression-based segmentation, histogram-based segmentation, region-growing segmentation, partial differential equation-based segmentation, watershed transformation, model-based segmentation, and/or others.

FIG. 2A furthermore illustrates the object type 204 and/or the object segmentation 206 provided as input to the object state description module(s) 112. By illustrating the object segmentation 206 provided as input to the object state description module(s) 112, FIG. 2A indicates that image data from the original input image 202 may be selected as input to the object state description module(s) 112 based upon the object segmentation 206 (in some instances, the entirety of the image data of the original input image 202 is provided as input to the object state description module(s) 112). In some instances, by utilizing image data that is focused on the object 202A (e.g., via the segmentation 206, omitting background or other image data present in the image 202), the object state description module(s) 112 may generate labels that are focused on the state of the object and may avoid becoming influenced by image data representing background portions of the image during the training or inference stage.

The object state description module(s) 112 is/are configured to receive object type classification input and image data input to generate a non-discrete, multi-dimensional (e.g., N-dimensional) representation of object state. In this regard, the object state description module(s) 112 may be trained in an unsupervised manner on a set of training data to generate a framework for representing object states in a continuous numerical manner (e.g., in any number of dimensions).

FIG. 2A illustrates an object state vector 208 as an output of the object state description module(s) 112. In some implementations, the object state vector 208 comprises an embedding generated by the object state description module(s) 112. The embedding may comprise an intermediate numerical representation (e.g., a sequence of numbers) of the input data generated within the object state description module(s) 112 (e.g., an output of one or more hidden layers of the object state description module(s) 112). In this regard, the object state vector 208 may comprise an N-dimensional vector representing object state, rather than a discrete classification of object state. As will be described in more detail hereinafter, the object state vector 208 (or, importantly, collections of object state vectors) may be compared to other object state vectors (or other collections of object state vectors) associated with other input images (or other sets of input images) to facilitate image comparison, image retrieval, and/or other tasks.

Although FIG. 2A focuses, in at least some respects, on an example in which a single image 202 depicting a single object 202A is utilized as input to generate a single object state vector 208, the principles discussed above with reference to FIG. 2A may be generalized to sets of images, sets of objects, etc.

Figure 2B:
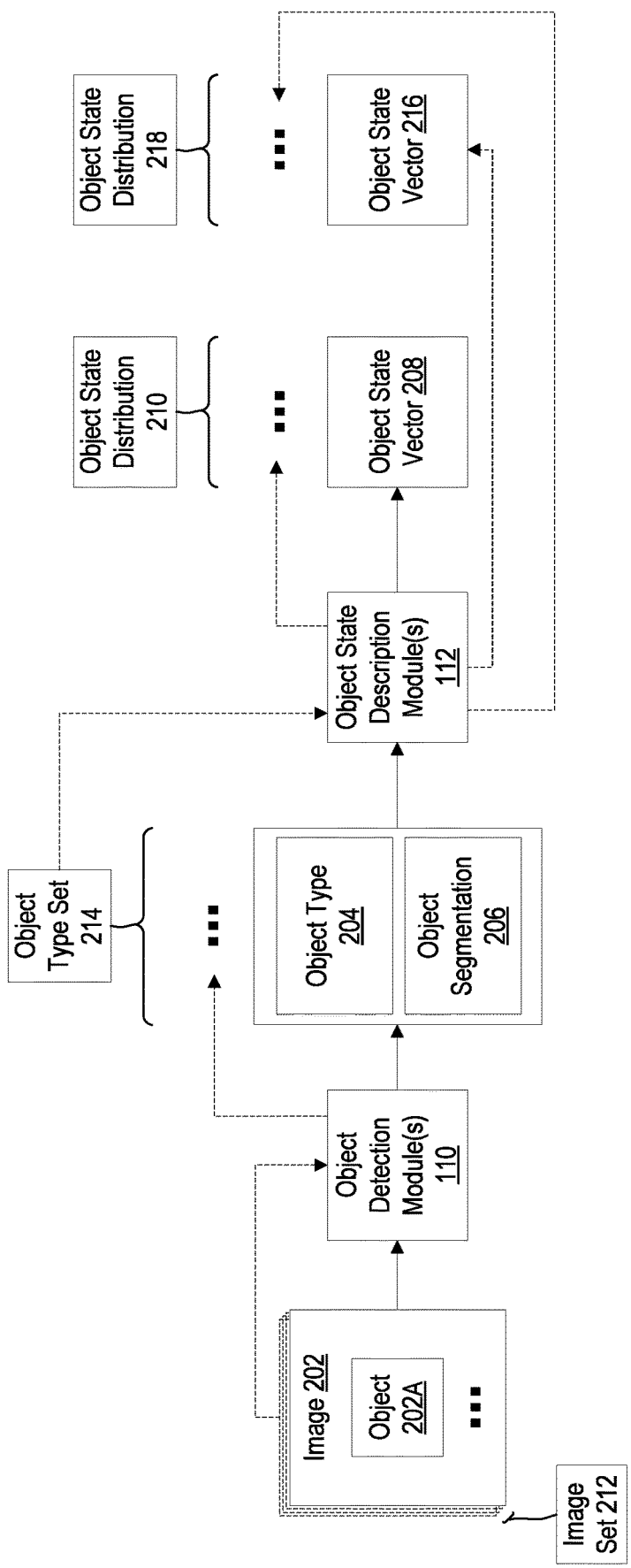

For example, FIG. 2B illustrates an ellipsis within the image 202, indicating that the image 202 may depict other objects in addition to the object 202A discussed above. For example, the image 202 may depict both a dog (e.g., object 202A) and a cat (a separate object). In this regard, an image 202 input to the object detection module(s) 110 may comprise any number of objects. Accordingly, FIG. 2B also illustrates a dashed line extending from the object detection module(s) 110 to an ellipsis above the object type 204 and object segmentation 206 labels associated with the object 202A as discussed above, indicating that the object detection module(s) 110 may generate respective object type and/or respective object segmentation labels for any number of objects represented in the input image(s) (e.g., image 202). The collection of object type labels (and/or object segmentation labels) may be defined as an object type set 214, as depicted in FIG. 2B.

In some instances, an entire object type set 214, including type classifications for all objects represented in the input image(s) may be utilized as input to the object state description module(s) 112, as indicated in FIG. 2B by the dashed arrow extending from the object type set 214 to the object state description module(s) 112. For example, the respective object type classifications and respective image data from the input image(s) (e.g., determined based on the respective object segmentations) may be utilized as input to the object state description module(s) 112. Correspondingly, the object state description module(s) 112 may be configured to generate a separate object state vector for each object represented in the input image(s) (or for each object type classification of the object type set 214), as indicated in FIG. 2B by the dashed arrow extending from the object state description module(s) 112 to the ellipsis above the object state vector 208.

FIG. 2B furthermore illustrates that a collection of object state vectors may be defined as an object state distribution 210 (e.g., including the object state vector 208 and all other object state vectors generated for objects of the input image(s), such as image 202, as represented by the ellipsis above the object state vector 208). The collection of object state vectors forming an object state distribution 210 may be conceptualized as a point cloud in a potentially high-dimensional space. As will be described in more detail hereinafter, distances may be computed between different object state distributions, and the computed distances may provide an indication of the similarity or difference between object states represented in images associated with the different object state distributions.

As noted above, an input image 202 may comprise multiple objects (e.g., object 202A and others indicated by the ellipsis within image 202). In some instances, an input image 202 may comprise different subsets of objects, where objects within a common subset are associated with the same or similar object type classifications. For example, the image 202 may depict two dogs (e.g., associated with the type classification "dog") and two cats (e.g., associated with the type classification "cat"), the dogs forming a first subset of objects and the cats forming a second subset of objects. One object state distribution (e.g., object state distribution 210) may be defined using the object state vectors generated for the two dogs (e.g., object state vector 208 and associated ellipsis), while another object state distribution (e.g., object state distribution 218) may be defined using the object state vectors generated for the two cats (e.g., object state vector 216 and associated ellipsis).

Aside from object type classification, multiple different object state distributions may be formed for a single image input (or a single set of image input) along other lines, such as image region, object state aspect of interest (e.g., pose vs facial expression), etc.

FIG. 2B furthermore illustrates that the image 202 discussed hereinabove may be part of an image set 212 (as used herein, a "set" may comprise one or more of any referenced element). The image set 212 may comprise any number of images and/or image frames (e.g., image frames of a video). FIG. 2B furthermore illustrates a dashed line extending from other images of the image set 212 toward the object detection module(s) 110, indicating that multiple images may be utilized as input to the object detection module(s) 110, triggering identification of object type classifications and/or object segmentations for objects represented in the image set, and ultimately the generation of per-object object state vectors via the object state description module(s) 112. In this way, one or more object state distributions may be defined utilizing multiple images (e.g., image set 212) as input. For example, a single object state distribution may be defined based on the entire image set 212 (e.g., an entire video file), incorporating object state vectors for all objects represented in each image of the image set 212. As another example, multiple object state distributions may be generated based on the input image set 212, such as by generating different object state distributions for different types of objects represented among the image set 212, by generating different object state distributions for different images of the image set 212, etc.

In some implementations, the object detection module(s) 110 include multiple modules, each being trained/refined in an at least partially different manner (e.g., utilizing different training data, such as to fine-tune certain modules for classifying and/or segmenting particular subject matter). In some instances, the particular module of the object detection module(s) 110 used to generate the object type classification and/or object segmentation labels is selected based on contextual information (e.g., user input, enterprise-specific, user-specific, use-specific, based on a search query, metadata, or other information accompanying the input image(s), etc.). Similarly, the object state description module(s) 112 may comprise multiple modules, each being trained/refined in an at least partially different manner (e.g., utilizing different training data), such as to fine-tune certain modules for numerically describing states of particular types of objects). In some instances, the particular module of the object state description module(s) 112 used to generate object state vectors is selected based on contextual information (e.g., user input, enterprise-specific, user-specific, use-specific, based on the input object type classification and/or object segmentation, based on a search query, metadata, or other information accompanying the input image(s), etc.).

As indicated above, object state distributions associated with different image sets may be compared to one another to determine/indicate differences or similarities between the different image sets. FIGS. 3A through 3F illustrate various implementations of object state distributions, which may be generated in accordance with the principles discussed hereinabove with reference to FIGS. 2A and 2B.

Figure 3A:
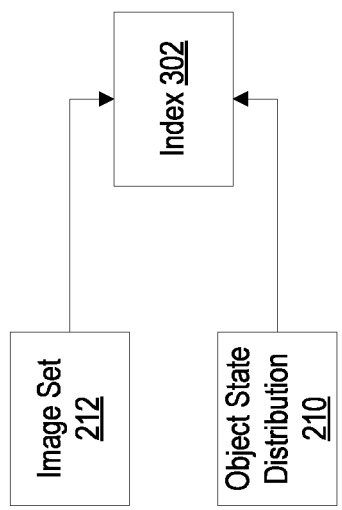
FIG. 3A illustrates a conceptual representation of image indexing using object state distributions.

FIG. 3A illustrates a conceptual representation of image indexing using object state distributions. In particular, FIG. 3A illustrates the image set 212 of FIG. 2B, which may comprise one or more images. FIG. 3A also depicts the object state distribution 210, which, as discussed above, may be generated for the image set 212 utilizing object detection module(s) 110 and object state description module(s) 112, as discussed above. FIG. 3A indicates that the image set 212 and the object state distribution 210 may be indexed in combination or association with one another (e.g., within index 302). For example, a web crawler module or system may access an image on a website and generate an object state distribution for the image. The object state distributions may be indexed in association with the image to enable subsequent retrieval of the image in future image searches via comparison of the indexed object state distribution to a query object state distribution associated with a search query (as will be discussed in more detail hereinbelow).

Figure 3B:
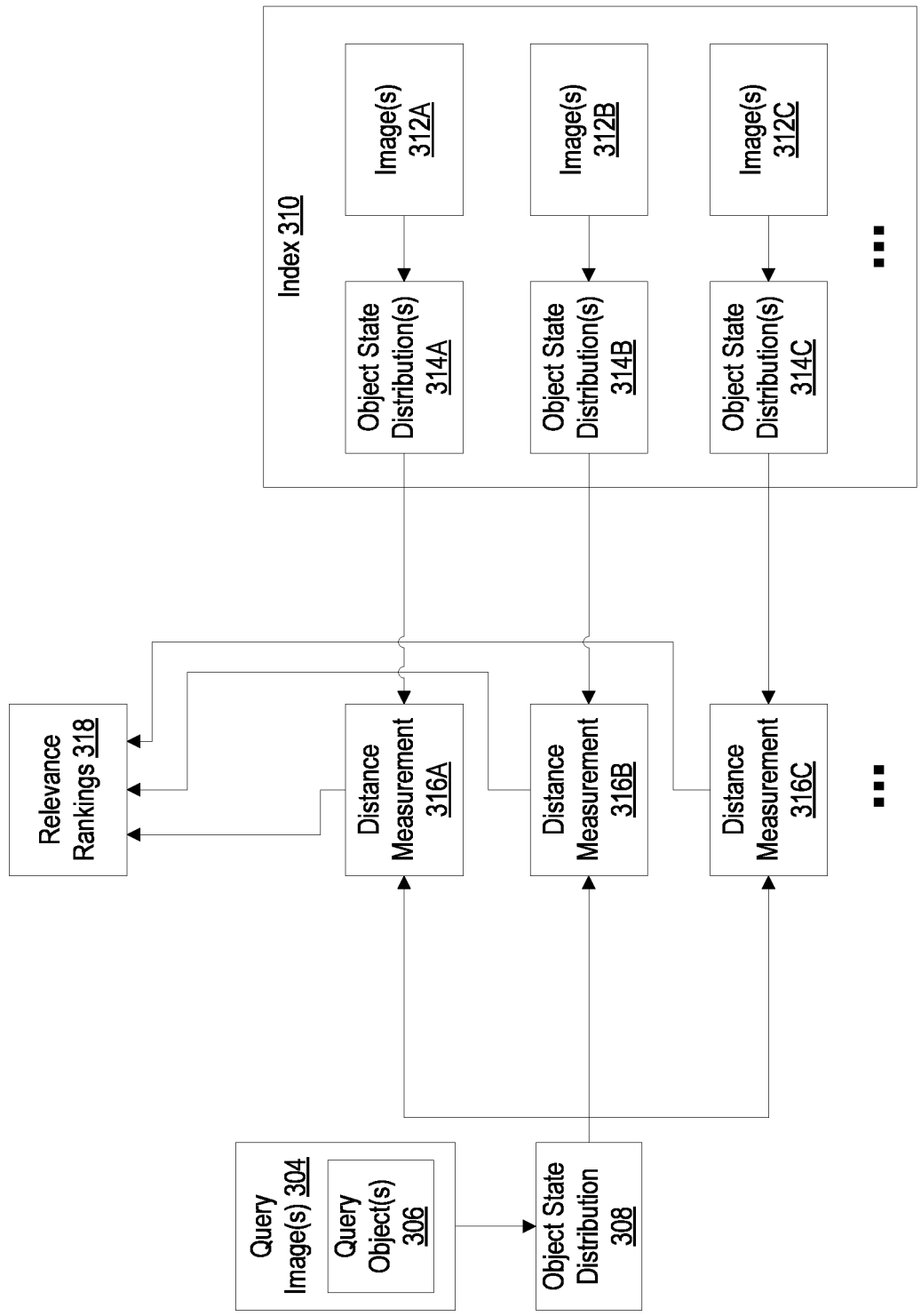
FIG. 3B illustrates a schematic representation of image searching using object state distributions.

FIG. 3B illustrates a schematic representation of image searching using object state distributions. In particular, FIG. 3B illustrates query image(s) 304, which may comprise any number or type of images depicting any number or type of query object(s) 306. The query image(s) 304 (and/or the query object(s) 306 themselves) may in some instances be selected or entered by a user desiring to search for images that include representations of objects that are similar to the query object(s) 306 (see FIGS. 4 and 5 and associated description).

FIG. 3B also illustrates object state distribution 308, which may be generated based on the query image(s) 304 and query object(s) 306 in accordance with the principles discussed hereinabove with reference to FIGS. 2A and 2B. The example of FIG. 3B includes an index 310, wherein image(s) 312A, 312B, and 312C are indexed in association with respective object state distribution(s) 314A, 314B, and 314C (the index 310 may comprise any number of image(s) and associated object state distribution(s), as indicated by the ellipsis within the index 310).

FIG. 3B depicts a distance measurement 316A computed between the object state distribution 308 and the object state distribution(s) 314A associated with image(s) 312A. The distance measurement 316A may take on various forms for representing the distance between different object state distributions (which, as noted above, may be defined as sets of object state vectors/embeddings and may be conceptualized as point clouds in a potentially high-dimensional space). For example, the distance measurement 316A may be computed as a Kullback-Leibler divergence, energy distance, Hausdorff distance, maximum mean discrepancy, Wasserstein metric, and/or others.

The difference measurement 316A between the object state distribution 308 and the object state distribution(s) 314A may indicate a difference or similarity between the images (or objects) associated with the object state distributions (e.g., query image(s) 304 and image(s), or objects represented therein). For example, the similarity between the query image(s) 304 and the image(s) 312A may be inversely related to the distance measurement 316A, such that a high distance measurement 316A indicates a low amount of similarity between the query image(s) 304 and the image(s) 312A, while a low distance measurement 316 indicates a high amount of similarity between the query image(s) 304 and the image(s) 312A.

FIG. 3B illustrates additional distance measurements between the object state distribution 308 and other object state distributions associated with images of the index 310. In particular, FIG. 3B shows distance measurement 316B between the object state distribution 308 and the object state distribution(s) 314B associated with image(s) 312B. FIG. 3B also shows distance measurement 316C between the object state distribution 308 and the object state distribution(s) 314C associated with image(s) 312C. The ellipsis below distance measurement 316C indicates that any number of distance measurements may be determined.

FIG. 3B furthermore indicates that the distance measurements 316A, 316B, and 316C may be used to determine relevance rankings 318 for the image(s) 312A, 312B, and 312C relative to the query image(s) 304 (or the query object(s) 306). The relevance rankings 318 may be inversely related to the distance measurements. For example, a higher distance measurement from the query object state distribution 308 may result in a lower relevance ranking for the image(s) associated with the indexed object state distribution, whereas a lower distance measurement from the query object state distribution 308 may result in a higher relevance ranking for the image(s) associated with the indexed object state distribution. In this way, object state distributions may be used to facilitate retrieval of relevant images in a manner that is not limited to discrete indexed image tags.

One will appreciate, in view of the present disclosure, that other factors may be utilized to determine relevance rankings 318 in addition to distance measurements.

In some instances, the object state distribution 308 used to perform the image retrieval discussed in FIG. 3B is selected from a plurality of object state distributions associated with the query image(s) 304 or the query object(s) 306. For example, as noted above with reference to FIG. 2B, multiple object state distributions may be defined for a single input image (or set of input images). Thus, in such instances, the particular query object state distribution used for image retrieval may be selected based on one or more contextual factors (e.g., user input, enterprise, user attributes (e.g., user activity history), search platform (e.g., image index to be searched within), subject matter of search, etc.).

Similarly, in some instances, images represented in an index may have multiple object state distributions associated therewith. Accordingly, in some instances, the particular indexed object state distribution used for distance measurements may be selected based on one or more contextual factors (e.g., based on the type classification and/or segmentation of the query objects, user input, enterprise, user attributes (e.g., user activity history), search platform (e.g., image index to be searched within), subject matter of search, etc.).

In a general sense, the relevance rankings 318 of FIG. 3B may be regarded as labels which may be assigned based upon the distance measure. The relevance rankings 318 may be assigned to the images 312A, 312B, and 312C of the index 310. As will be described hereinbelow in more detail, other types of labels may be generated and/or assigned based on distance measurements between object state distributions associated with different image sets (which may contain one or more images).

Figure 3C:
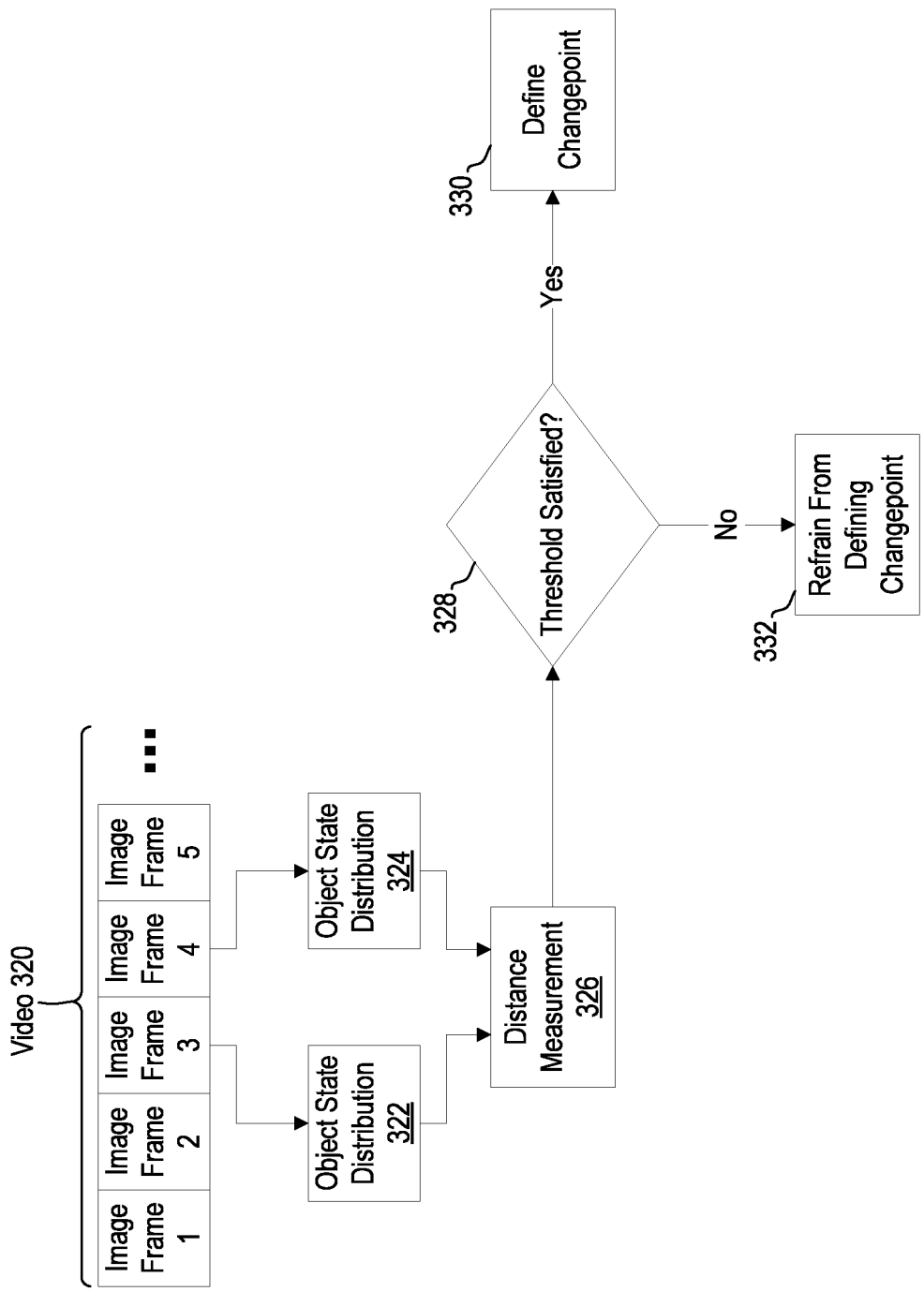
FIGS. 3C and 3D illustrate schematic representations of video changepoint analysis using object state distributions.
Figure 3D:
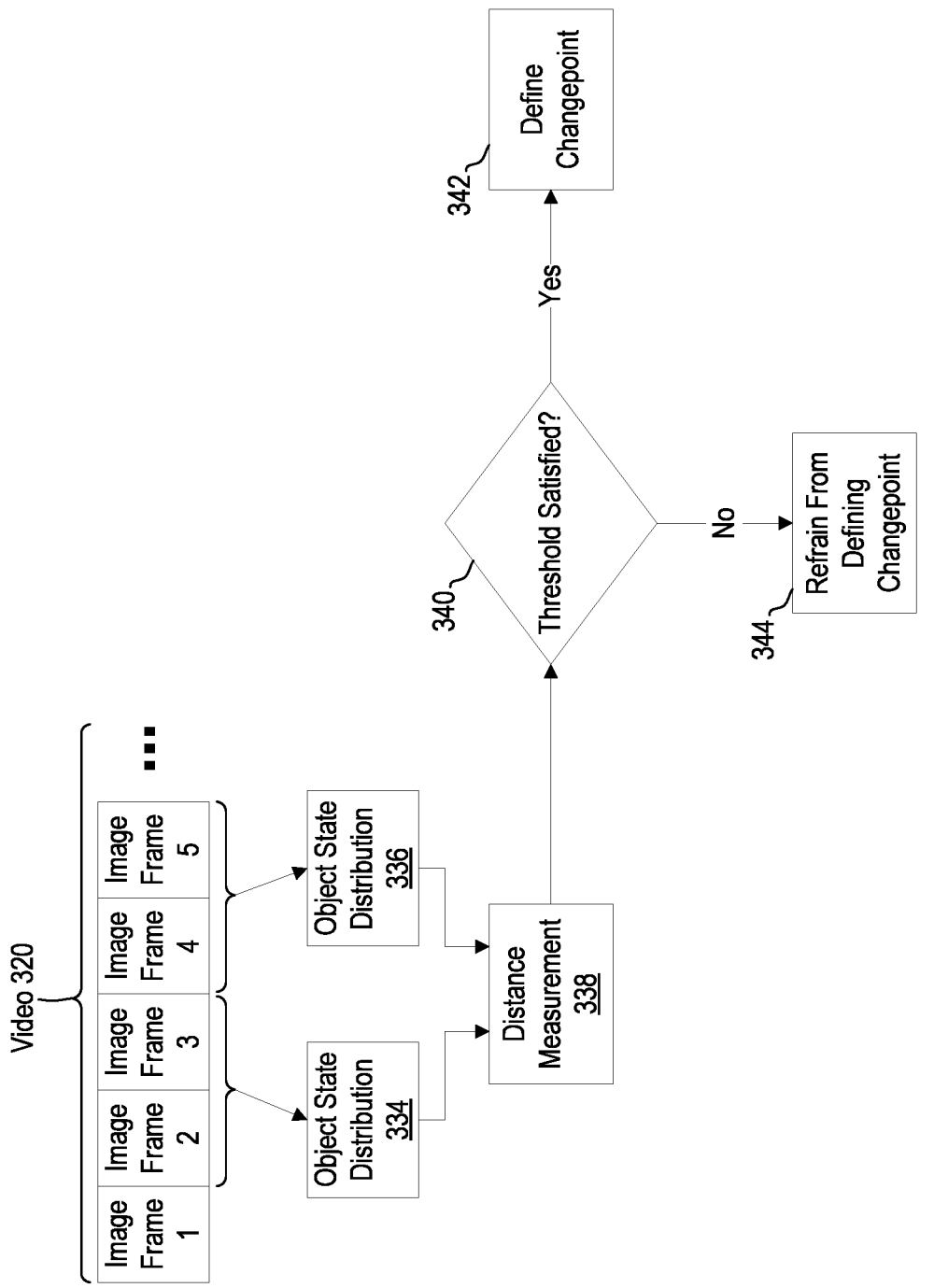
Figure 3E:
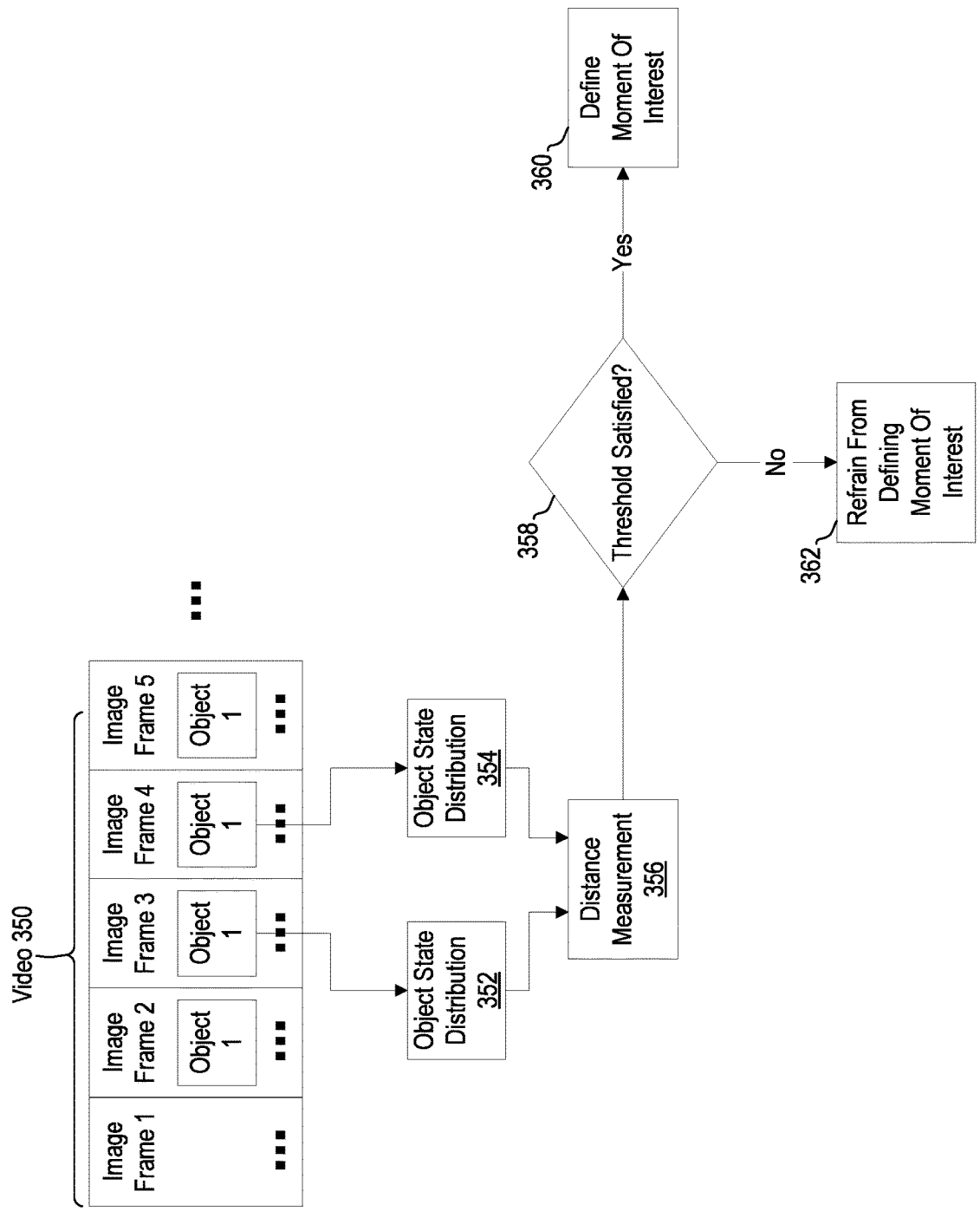
FIG. 3E illustrates a schematic representation of video moment of interest analysis using object state distributions.

FIGS. 3C, 3D, and 3E illustrate schematic representations of video summarization techniques that use object state distributions. FIGS. 3C and 3D relate to video changepoint analysis, whereas FIG. 3E relates to video moment of interest analysis. A changepoint may be defined as a time in a video sequence when the distribution of object states changes significantly. For instances, camera movements and/or movement of objects in captured scenes may give rise to video changepoints.

FIG. 3C depicts a few example image frames (e.g., image frame 1, image frame 2, image frame 3, image frame 4, image frame 5, etc.) of a video 320. FIG. 3C illustrates an object state distribution 322 generated based on image frame 3 of the video 320, and another object state distribution 324 generated based on image frame 4 of the video 320. The object state distributions 322 and 324 may be generated in accordance with the principles discussed hereinabove with reference to FIGS. 2A and 2B (e.g., object state distribution 210). Image frames 3 and 4 of the video 320 are illustrated as temporally contiguous frames. Thus, a large difference between the object state distributions 322 and 324 associated with the temporally contiguous image frames 3 and 4 of the video 320 may indicate a changepoint at a time corresponding to these image frames.

FIG. 3C shows a distance measurement 326 computed between the object state distribution 322 associated with frame 3 of the video 320 and the object state distribution 324 associated with frame 4 of the video 320. The distance measurement 326 may be computed in accordance with the principles discussed hereinabove with reference to FIG. 3B (e.g., distance measurements 316A, 316B, and 316B).

FIG. 3C furthermore illustrates decision block 328, whereby a system performing changepoint analysis may determine whether a threshold distance measurement is satisfied by the distance measurement 326 between the object state distributions 322 and 324. Where such a threshold is satisfied, a changepoint may be defined or reported (block 330 of FIG. 3C). For example, a timestamp or timepoint associated with the changepoint may be reported or recorded (e.g., a timestamp or timepoint of image frame 3 or 4 or of a transition between image frames 3 and 4), or one or more of the image frames themselves may be reported/flagged as changepoints. In some instances, the threshold for defining a changepoint is set based on user input, video context (e.g., videos where object states are dynamic may have higher thresholds), and/or other factors. Where such a threshold is not satisfied, a changepoint is not defined or reported (block 332 of FIG. 3C).

Although FIG. 3C illustrates object state distributions for single image frames of a video being compared with one another, the principles discussed above may be applied for sets of image frames. For example, FIG. 3D illustrates the video 320 of FIG. 3C, but with an object state distribution 334 defined using a set of image frames including image frames 2 and 3 of the video 320 as inputs. FIG. 3D also illustrates another object state distribution 336 defined using another set of image frames including image frames 4 and 5 of the video 320 as inputs. The different sets of image frames are temporally contiguous, as before.

FIG. 3D illustrates a distance measurement 338 computed based on the object state distributions 334 and 336. Similar distance thresholding (see decision blocks 340 of FIG. 3D, which corresponds to decision block 328 of FIG. 3C) and conditional actions (see blocks 342 and 344 of FIG. 3D, which correspond to blocks 330 and 332 of FIG. 3C, respectively) to those of FIG. 3C may be performed based on the distance measurement 338 of FIG. 3D.

It should be noted that changepoint analysis may be performed using any number of contiguous sets of image frames of a video. For example, an image frame set size may be predefined (e.g., 3 image frames per set), and object state distributions may be generated for each consecutive set of 3 image frames of the video. Consecutive object state distributions may be compared to another to obtain distance measurements. The distance measurements may be ranked, and changepoints may be recorded or reported based on the ranking (e.g., contiguous image frame sets associated with the highest 10% of distance measurements may be reported as including changepoints). In some implementations, a summary of changepoints for a video may be automatically generated/presented (e.g., highlighting or emphasizing timepoints associated with the detected changepoints).

As noted above, FIG. 3E illustrates a schematic representation of video moment of interest analysis using object state distributions. A moment of interest may be defined as a time in a video sequence when the distribution of object states for one or more particular objects represented in the video sequence changes significantly. For instances, activity of objects in captured scenes may give rise to video moments of interest.

FIG. 3E depicts a few example image frames (e.g., image frame 1, image frame 2, image frame 3, image frame 4, image frame 5, etc.) of a video 350. At least some of the image frames of the video 350 depict an object, in particular object 1. FIG. 3E also illustrates ellipses in some of the image frames of the video 350, indicating that any number of the image frames of the video 350 may depict other objects in addition to object 1.

As noted above with reference to FIG. 2B, an object state distribution 352 may be generated focusing on one or more subsets of objects represented in an image frame. FIG. 3E illustrates an object state distribution 352 generated based on image frame 3 of the video 320, in particular utilizing image data of image frame 3 that represents object 1. FIG. 3E also illustrates another object state distribution 354 generated based on image data of image frame 4 of the video 320 that depicts object 1. In some implementations, the subset(s) of objects (e.g., object 1 in the example of FIG. 3E) for which object state distributions are generated for moment of interest analysis is/are defined based upon user input, analysis context (e.g., enterprise- or user-specific preferences), and/or other contextual factors.

Image frames 3 and 4 of the video 350 are illustrated as temporally contiguous frames. Thus, a large difference between the object state distributions 352 and 354 for object 1 associated with the temporally contiguous image frames 3 and 4 of the video 350 may indicate a moment of interest at a time corresponding to these image frames (e.g., a moment where the object state for object 1 changes).

FIG. 3E shows a distance measurement 356 computed between the object state distribution 352 associated with object 1 in image frame 3 of the video 350 and the object state distribution 354 associated with object 1 in image frame 4 of the video 350. FIG. 3E furthermore illustrates decision block 358, whereby a system performing moment of interest analysis may determine whether a threshold distance measurement is satisfied by the distance measurement 356 between the object state distributions 352 and 354. Where such a threshold is satisfied, a moment of interest may be defined or reported (block 360 of FIG. 3E). For example, a timestamp or timepoint associated with the moment of interest may be reported or recorded (e.g., a timestamp or timepoint of image frame 3 or 4 or of a transition between image frames 3 and 4), or one or more of the image frames themselves may be reported/flagged as moments of interest. In some instances, the threshold for defining a moment of interest is set based on user input, video/object context (e.g., objects that normally move, transform, or otherwise change state may have higher thresholds), and/or other factors. Where such a threshold is not satisfied, a moment of interest is not defined or reported (block 362 of FIG. 3E).

Although FIG. 3E illustrates object state distributions for single image frames of a video being compared with one another to determine moments of interest, the principles discussed above may be applied for sets of image frames (e.g., sets of contiguous image frames, similar to those shown in FIG. 3D for performing changepoint analysis).

It should be noted that moment of interest analysis may be performed using any number of contiguous sets of image frames of a video. For example, an image frame set size may be predefined (e.g., 3 image frames per set), and object state distributions may be generated for each consecutive set of 3 image frames of the video. Consecutive object state distributions may be compared to another to obtain distance measurements. The distance measurements may be ranked, and moments of interest may be recorded or reported based on the ranking (e.g., contiguous image frame sets associated with the highest 10% of distance measurements may be reported as including moments of interest). In some implementations, a summary of moments of interest for a video may be automatically generated/presented (e.g., highlighting or emphasizing timepoints associated with the detected changepoints, and/or highlighting the changes in the object(s) of interest themselves).

As noted above, object state distributions may be implemented to determine compliance with one more policies. By way of illustrative example, in a manufacturing context, a policy may exist that certain equipment be stored or laid down in a particular manner or configuration (e.g., cutting instruments should have their blades covered or be oriented in a particular manner when placed on a workbench or other surface). Object state distributions may be implemented to detect deviations from such and other policies.

Figure 3F:
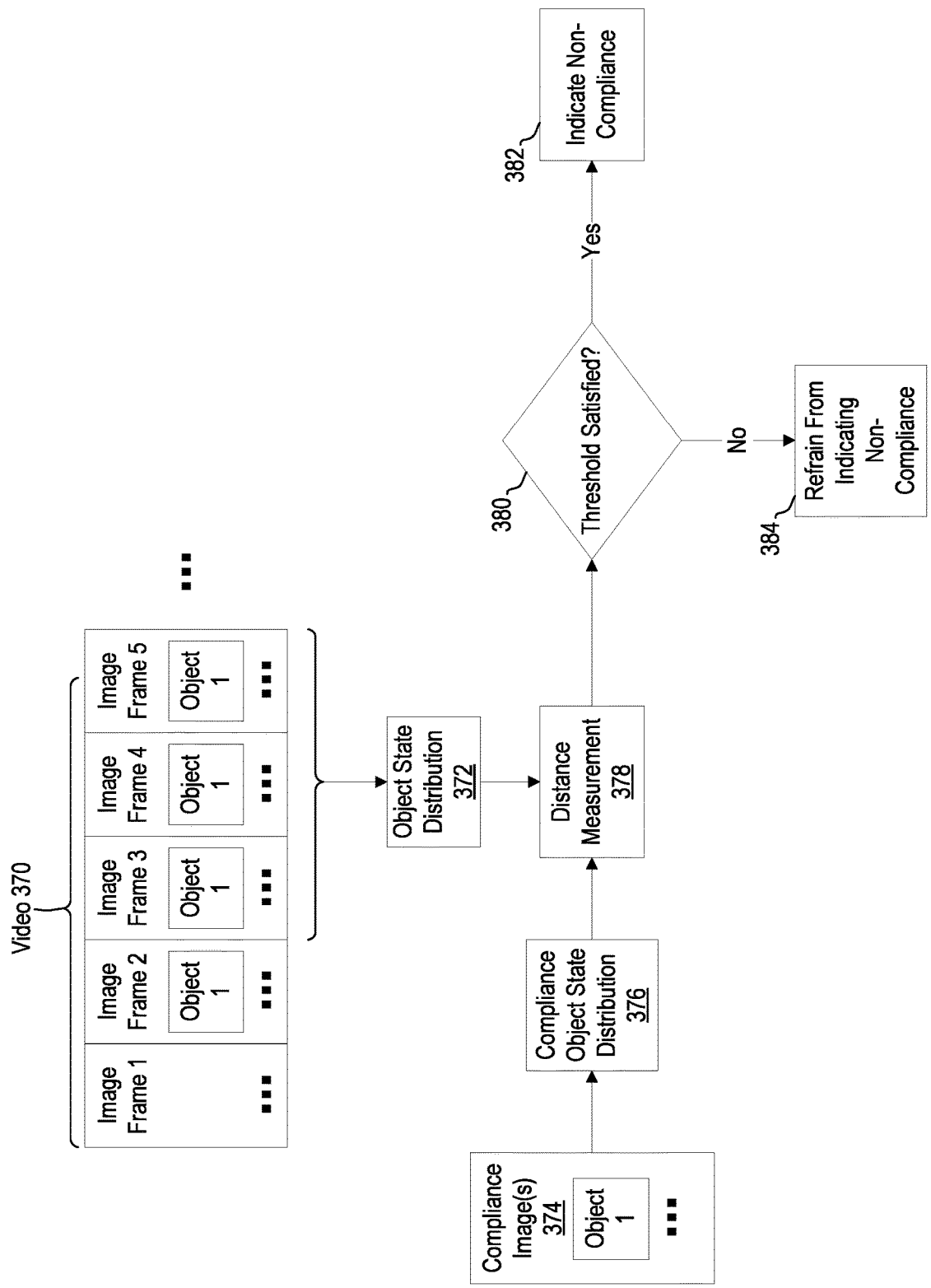
FIG. 3F illustrates a schematic representation of determining compliance using object state distributions.

FIG. 3F illustrates a schematic representation of determining compliance using object state distributions. In particular, FIG. 3F illustrates a video 370, which may comprise a live video feed captured using one or more image sensors. For instance, continuing the manufacturing example noted above, an image sensor may be placed to capture a scene or environment of a manufacturing floor where deviations from policy may occur or where such deviations may prove costly if undetected.

The video 370 of FIG. 3F includes image frames 1 through 5, at least some of which depict object 1 (the ellipses indicate that the image frames may depict additional objects as well). One or more policies may be predefined for object 1 (e.g., object 1 should have a particular pose when laid down). As shown in FIG. 3F, image data of one or more of the image frames depicting object 1 (e.g., image frames 3, 4, and 5) may be utilized to generate an object state distribution 372 for object 1.

FIG. 3F furthermore shows compliance image(s) 374, which may depict object 1 (or an object similar to object 1) in a state of compliance with any policies associated with object 1 (e.g., with pose during placement on a workbench that accords with policy). A compliance object state distribution 376 may thus be generated based on the depiction of object 1 in the compliance image(s) 374.

The object state distribution 372 for object 1 as captured in the video 370 (e.g., in image frames 3, 4, and 5) may be compared to the compliance object state distribution 376 for object 1 in the compliance image(s) 374 via distance measurement 378. The distance measurement 378 may be used to determine whether the state of object 1 as captured in the video 370 is in compliance with the predefined policies for states of object 1 as represented in the compliance image(s) 374. For example, FIG. 3F illustrates decision block 380, whereby a system determining policy compliance (e.g., based on an input video stream) may determine whether a threshold distance measurement is satisfied by the distance measurement between the object state distribution 372 and the compliance object state distribution 376. Where such a threshold is satisfied, non-compliance may be indicated or reported (block 382 of FIG. 3F). For example, a label or other indication of deviation or non-compliance may be associated with frames of the video 370 (e.g., frames 3, 4, and/or 5), and the label or other notification of deviation or non-compliance (optionally with one or more image frames depicting the non-compliance) may be presented to an appropriate entity. Notifications may take on various forms, such as sending an electronic message or presenting audio and/or visual signals to cause available persons (or machinery) to bring non-compliant objects into a state of compliance.

Where a non-compliance threshold is not satisfied in accordance with decision block 380, a system may refrain from indicating non-compliance (block 384 of FIG. 3F).

Figure 4:
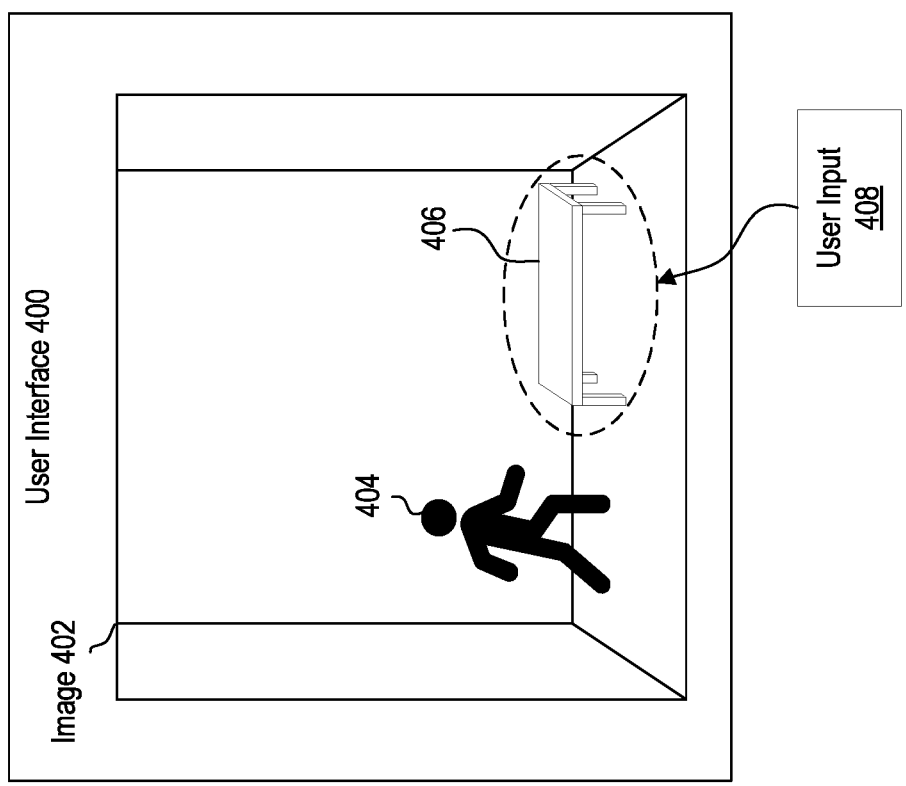
FIG. 4 illustrates example user interface elements for facilitating generation of object state distributions.

FIG. 4 illustrates example user interface elements for facilitating generation of object state distributions. For example, FIG. 4 illustrates a user interface 400 (e.g., a graphical user interface) within which an image 402 is presented. The image 402 includes various objects, including a human 404 and a table 406, etc. As noted above, user input may be provided selecting particular objects or subsets of objects within one or more images to cause one or more object state distributions to be generated based on the particular objects or subsets of objects (e.g., excluding image data representing one or more separate objects outside of the in the one or more images).

Accordingly, FIG. 4 conceptually depicts user input 408 directed to one of the objects of image 402 presented in the user interface 400. In particular, FIG. 4 shows the user input 408 directed to the table 406 of image 402. Based on the user input 408, a system may utilize image data from the image 402 as input to generate an object type classification, object segmentation, and/or object state vector/distribution for the table 406 (e.g., as discussed hereinabove with reference to FIGS. 2A and 2B.

Although FIG. 4 depicts the user input 408 directed to a single instance of an object of FIG. 402, the user input 408 may be directed to and/or select one or more classes of objects in one or more image frames. For example, the image 402 may be one of a plurality of image frames (e.g., of a video), and selection of an object in one image frame may cause a system to generate an object state distribution based on instances of the object found in multiple image frames of the plurality of image frames. Furthermore, user input may be directed to multiple different types of objects (e.g., the human 404 and the table 406) to generate object state distributions based on user-defined collections of objects represented in one or more images.

The user input 408 for selecting one or more objects (or subsets of objects) in one or more images to trigger generation of one or more object state distributions may take on various forms. For example, a user may provide cursor or touch input (e.g., tracing a region of the image 402 corresponding to the object(s), or selecting one or more pixels of the image that depict the object(s)), gesture input, eye tracking input (e.g., focusing on one or more objects in the image 402), and/or other types of input directed to the object(s).

In some implementations, the user input 408 triggers an initial object segmentation operation (e.g., utilizing the object detection module(s) 110) that segments the selected object(s). For example, the user input 408 may select one or more pixels representing the table 406 in the image 402, and image data of the image 402 (e.g., based on the user input 408, or the entire image 402) may be provided to the object detection module(s) 110 to perform an initial segmentation of objects of the image 402 (e.g., a segmentation of at least the table 406, which may be proximate to the one or more pixels selected by the user input 408). An overlay of the segmentation may be displayed over the image 402 for selection by the user. For instance, a segmentation of all objects in the image 402 may be presented to the user, and the user may make one or more selections from among the segmented objects to trigger generation of one or more object state distributions (in some instances, an initial segmentation is performed without a user selection of one or more particular pixels of an image). Upon selection by the user, image data based upon the selected segmentation(s) (and corresponding object type classification(s)) may be utilized to generate an object state distribution, as discussed hereinabove with reference to FIGS. 2A and 2B.

The user input functionality discussed with reference to FIG. 4 may be implemented in various contexts, such as to facilitate image search (e.g., query objects may be selected), to define a compliance object state distribution, to select an object of interest for moment of interest analysis, etc.

Figure 5:
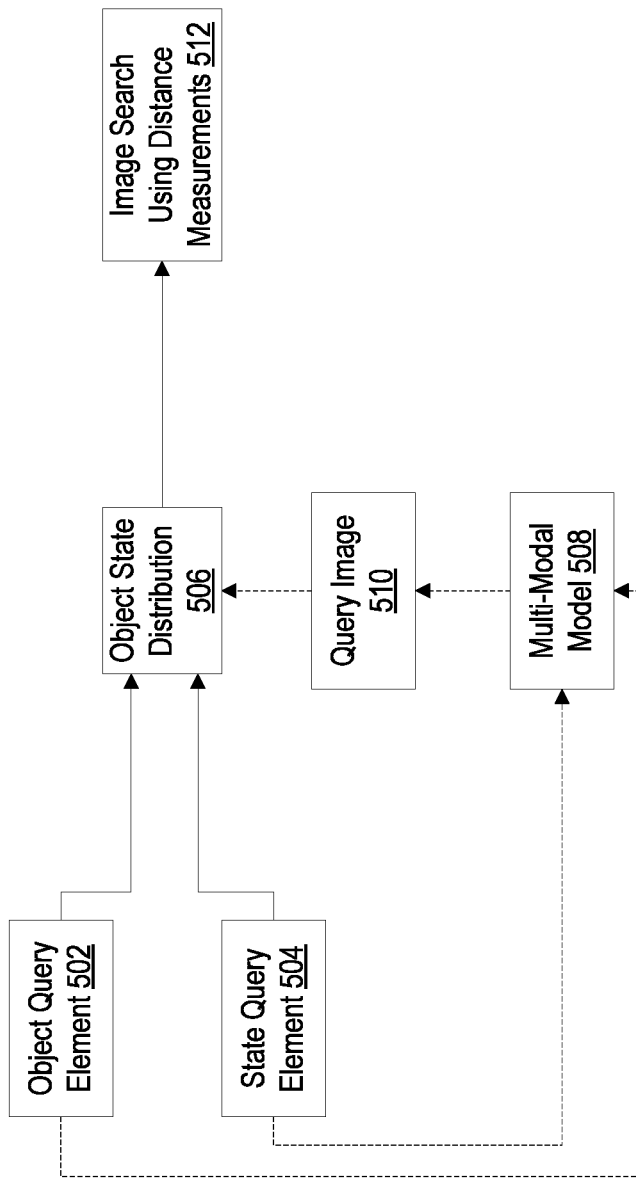
FIG. 5 illustrates example elements of a search query for facilitating image search using object state distributions.

FIG. 5 illustrates example elements of a search query for facilitating image search using object state distributions. In particular, FIG. 5 illustrates that image search may be performed utilizing multiple search query elements, such as an object query element 502 and a state query element 504. The object query element 502 and the state query element 504 may be used to generate an object state distribution 506, which may be utilized to facilitate image search using distance measurements 512 (e.g., as discussed hereinabove with reference to FIG. 3B).

The object query element 502 may take on various forms for indicating or representing one or more objects. For example, as noted above, the object query element 502 may comprise a set of one or more input images representing one or more objects, and/or a user selection of one or more objects represented in the set of input images (in some instances, a user selection of one or more objects may comprise text input accompanying image input, where the text indicates one or more object types represented in the image input that the user desires to drive the search query).

In some instances, objects may include various types of states that can drive a search query. For example, humans depicted in images can have multiple attributes, such as pose, clothing, emotion, activity, and/or other qualifications of states of being. Different object state description module(s) 112 may be trained to generate different object state vectors for different types of states (e.g., pose, emotion, attire, activity, etc.). Accordingly, the state query element 504 may comprise an indication of a type of state that a user desires to drive a search query (e.g., pose, emotion, color, attire, activity, and/or others). Such an indication may take on various forms, such as text input, a selection from among selectable options, etc.

In some instances, both an object query element 502 and a state query element 504 are provided without utilizing image data input (e.g., both may be provided in text form). For example, a user may input text indicating object type (e.g., "human") and additional text indicating object state (e.g., "running", "standing", "sad", etc.). In such instances, because image data input is used to generate object state vectors for an object state distribution 506, the object query element 502 and the state query element 504 may be used to obtain a query image for generating the object state distribution 506 for performing image search.

For example, FIG. 5 illustrates via dashed lines that the object query element 502 and the state query element 504 may be utilized as input to a multi-modal model 508, which may be configured to retrieve one or more suitable images, such as query image 510, that depict the object and state represented in the object query element 502 and the state query element 504 (other image retrieval modes are within the scope of the present disclosure in addition to multi-modal models). Image data from the query image 510 may then be utilized to generate the object state distribution 506 for image search. In some implementations, candidate query images retrieved via the multi-modal model 508 (or other image retrieval mode) are displayed to a user, allowing the user to select the query image 510 (and/or portions of the query image 510) for use in generating the object state distribution 506 for image search.

Example Method(s) for Implementing Object State Distributions

The following discussion now refers to a number of methods and method acts that may be performed by the disclosed systems. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 6:
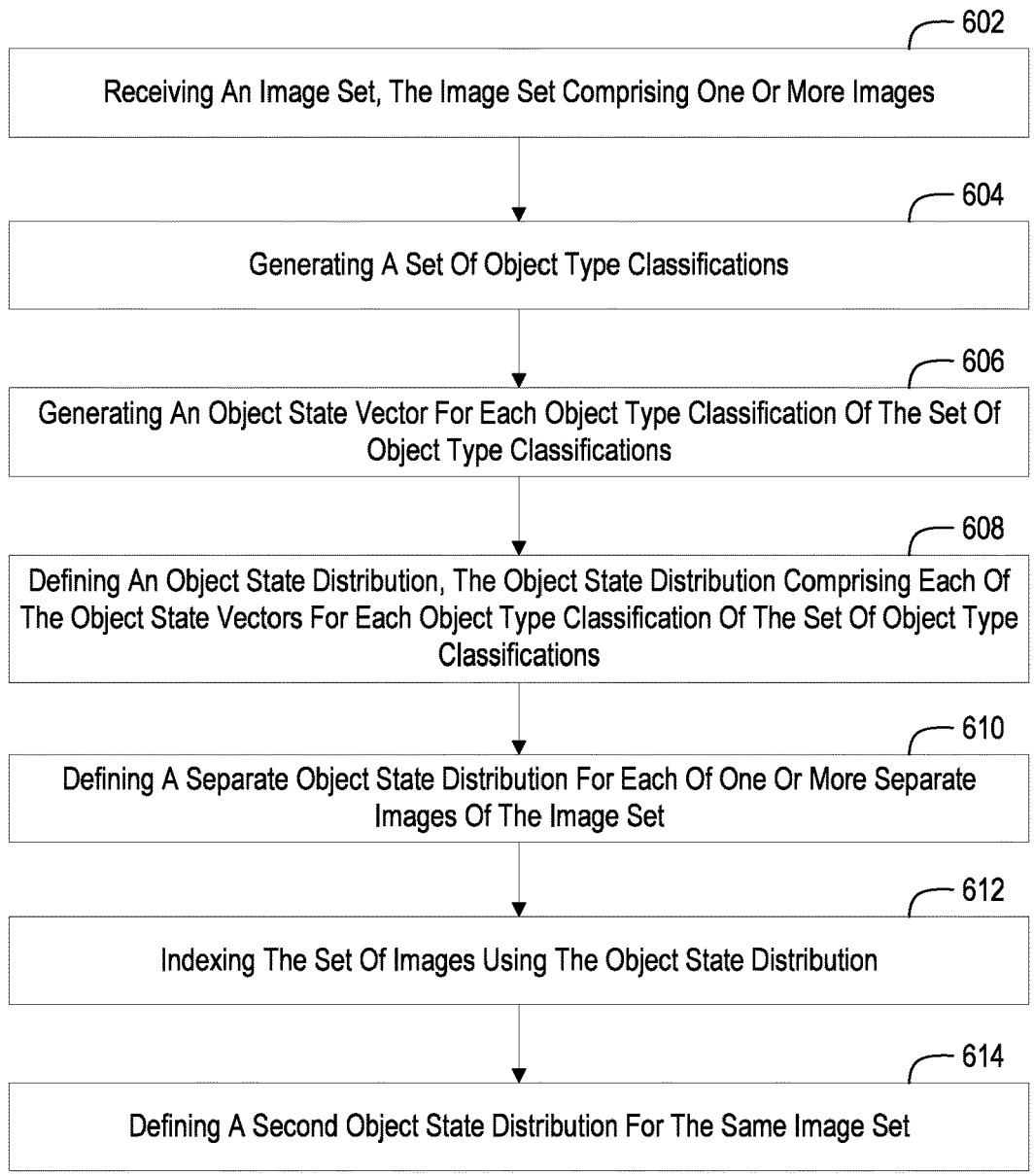
FIGS. 6 and 7 illustrate example flow diagrams depicting acts associated with generating one or more object state distributions.
Figure 7:
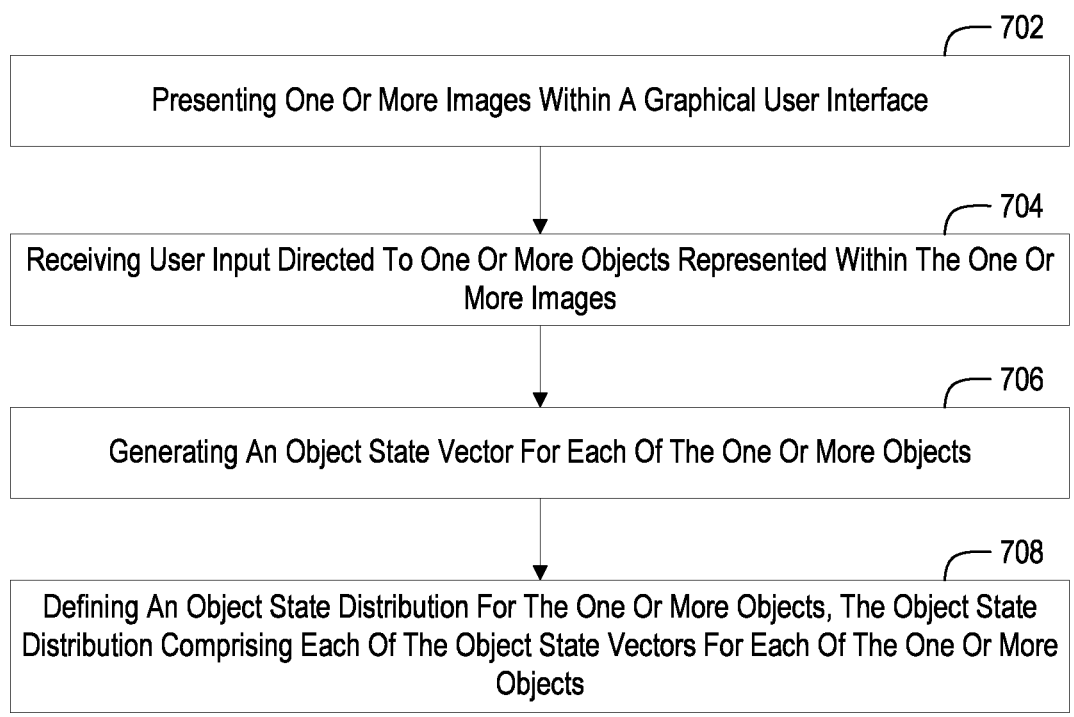

FIGS. 6 and 7 illustrate example flow diagrams 600 and 700 depicting acts associated with generating one or more object state distributions. The discussion of the various acts represented in the flow diagrams include references to various hardware components described in more detail with reference to FIG. 1.

Act 602 of flow diagram 600 of FIG. 6 includes receiving an image set, the image set comprising one or more images. Act 602 is performed, in some instances, by a system 100 utilizing processor(s) 102, storage 104, I/O system(s) 114, communication system(s) 116, and/or other components. The image set may take on various forms, such as a single image (e.g., an input image for an image search query), a set of discrete images, image frames of a video, images of a public or private website, etc. In some instances, the image set represents a state of deviation or a state of non-compliance.

Act 604 of flow diagram 600 includes generating a set of object type classifications. Act 604 is performed, in some instances, by a system 100 utilizing processor(s) 102, storage 104, object detection module(s) 110, I/O system(s) 114, communication system(s) 116, and/or other components. The set of object type classifications may include an object type classification for one or more objects represented in the image set. The set of object type classifications may be generated by utilizing the image set as input to one or more object detection modules. The set of object type classifications may be based on output of the one or more object detection modules. In some instances, the object detection module(s) used to generate the set of object type classifications is/are selected based on user input.

Act 606 of flow diagram 600 includes generating an object state vector for each object type classification of the set of object type classifications. Act 606 is performed, in some instances, by a system 100 utilizing processor(s) 102, storage 104, object state description module(s) 112, I/O system(s) 114, communication system(s) 116, and/or other components. The object state vectors may be generated by utilizing (i) the set of object type classifications and (ii) a set of image information based on the image set as input to one or more object state description modules. Each of the object state vectors may be a respective embedding generated by the one or more object state description modules. In some instances, the object state description module(s) used to generate the object state vector(s) is/are selected based on user input and/or the input object type classification. In some implementations, the set of image information used as input to the one or more object state description modules includes or is based upon object segmentation information for each of the one or more objects represented in the image set.

Act 608 of flow diagram 600 includes defining an object state distribution, the object state distribution comprising each of the object state vectors for each object type classification of the set of object type classifications. Act 608 is performed, in some instances, by a system 100 utilizing processor(s) 102, storage 104, I/O system(s) 114, communication system(s) 116, and/or other components. The object state distribution may comprise a matrix of each of the object state vectors for each object type classification and may be conceptualized as a point cloud in a potentially high dimensional space.

Act 610 of flow diagram 600 includes defining a separate object state distribution for each of one or more separate images of the image set. Act 610 is performed, in some instances, by a system 100 utilizing processor(s) 102, storage 104, object detection module(s) 110, object state description module(s) 112, I/O system(s) 114, communication system(s) 116, and/or other components.

Act 612 of flow diagram 600 includes indexing the set of images using the object state distribution. Act 612 is performed, in some instances, by a system 100 utilizing processor(s) 102, storage 104, I/O system(s) 114, communication system(s) 116, and/or other components. The indexing may enable the set of object state distributions to be accessed for image search functionality.

Act 614 of flow diagram 600 includes defining a second object state distribution for the same image set. Act 614 is performed, in some instances, by a system 100 utilizing processor(s) 102, storage 104, object detection module(s) 110, object state description module(s) 112, I/O system(s) 114, communication system(s) 116, and/or other components. In some instances, the second object state distribution is associated with one or more different objects represented in the image set (and/or with different state aspects, such as emotion rather than pose).

Act 702 of flow diagram 700 of FIG. 7 includes presenting one or more images within a graphical user interface. Act 702 is performed, in some instances, by a system 100 utilizing processor(s) 102, storage 104, I/O system(s) 114, communication system(s) 116, and/or other components. The one or more images may take on various forms, such as a single image (e.g., an input image for an image search query), a set of discrete images, image frames of a video, images of a public or private website, etc. The graphical user interface may be presented in various forms, such as on a 2D display, via a 3D hologram or projection, etc.

Act 704 of flow diagram 700 includes receiving user input directed to one or more objects represented within the one or more images. Act 704 is performed, in some instances, by a system 100 utilizing processor(s) 102, storage 104, I/O system(s) 114, communication system(s) 116, and/or other components. In some instances, the user input comprises a user selection of the one or more objects represented in a set of one or more images. In some implementations, the user input comprises cursor input directed to the one or more objects. Other types of input are within the scope of the present disclosure (e.g., touch input, eye tracking input, gesture input, text input indicating object type, and/or others).

Act 706 of flow diagram 700 includes generating an object state vector for each of the one or more objects. Act 706 is performed, in some instances, by a system 100 utilizing processor(s) 102, storage 104, object detection module(s) 110, object state description module(s) 112, I/O system(s) 114, communication system(s) 116, and/or other components. The object state vectors may be generated by utilizing (i) a set of object type classifications comprising an object type classification for each of the one or more objects and (ii) a set of image information based on the one or more images as input to one or more object state description modules. Each of the object state vectors is a respective embedding generated by the one or more object state description modules. The set of object type classifications may be generated utilizing image data from the one or more images as input to one or more object detection modules. The set of object type classifications may be based on output of the one or more object detection modules. In some instances, the image data utilized as input to the one or more object detection modules is based on the user input. For instance, such input may be directed to one or more segmented representations of the one or more objects represented within the one or more images (e.g., the one or more segmented representations of the one or more objects may be initially generated based on initial output of the one or more object detection modules).

Act 708 of flow diagram 700 includes defining an object state distribution for the one or more objects, the object state distribution comprising each of the object state vectors for each of the one or more objects. Act 708 is performed, in some instances, by a system 100 utilizing processor(s) 102, storage 104, object state description module(s) 112, I/O system(s) 114, communication system(s) 116, and/or other components.

Figure 8:
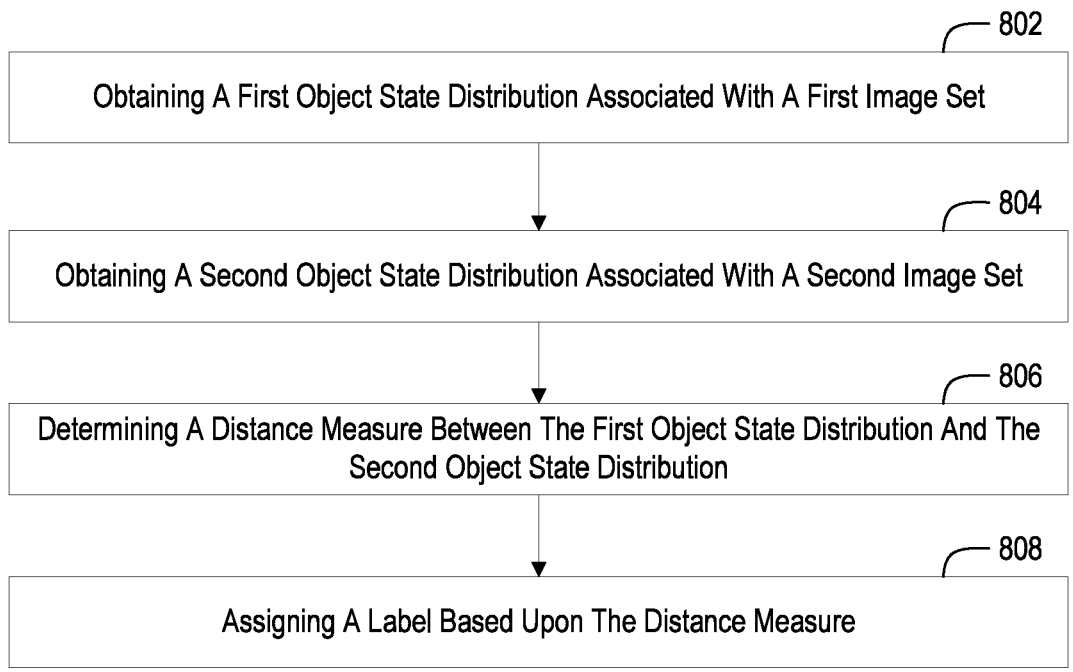
FIG. 8 illustrates an example flow diagram depicting acts associated with assigning one or more labels based on object state distributions.

FIG. 8 illustrates an example flow diagram 800 depicting acts associated with assigning one or more labels based on object state distributions. Act 802 of flow diagram 800 of FIG. 8 includes obtaining a first object state distribution associated with a first image set. Act 802 is performed, in some instances, by a system 100 utilizing processor(s) 102, storage 104, object detection module(s) 110, object state description module(s) 112, I/O system(s) 114, communication system(s) 116, and/or other components. The first image set may comprise one or more first images. The first object state distribution includes a first plurality of object state vectors generated based upon (i) a first set of object type classifications associated with the first image set and (ii) a first set of image information based on the first image set. The first plurality of object state vectors includes a first plurality of embeddings generated by one or more object state description modules.

In some instances, the first image set comprises an image search query. In some instances, the first plurality of object state vectors is associated with a first subset of objects represented in the first image set. In some instances, the first image set comprises a first set of one or more image frames of a video, and the second image set comprises a second set of one or more image frames of the video. In some instances, the first plurality of object state vectors and the second plurality of object state vectors are associated with a subset of one or more objects represented in the first set of one or more image frames and the second set of one or more image frames. In some instances, the one or more first images of the first image set are captured utilizing one or more image sensors.

Act 804 of flow diagram 800 includes obtaining a second object state distribution associated with a second image set. Act 804 is performed, in some instances, by a system 100 utilizing processor(s) 102, storage 104, object detection module(s) 110, object state description module(s) 112, I/O system(s) 114, communication system(s) 116, and/or other components. The second image set may include one or more second images. The second object state distribution includes a second plurality of object state vectors generated based upon (i) a second set of object type classifications associated with the second image set and (ii) a second set of image information based on the second image set. The second plurality of object state vectors includes a second plurality of embeddings generated by one or more object state description modules. In some instances, the second image set is part of an image index. In some instances, the second object state distribution is one of a plurality of second object state distributions associated with the second image set. In some instances, the first set of one or more image frames and the second set of one or more image frames are temporally contiguous or otherwise adjacent according to any sampling time interval or logical structuring. For example, a sparse sampling may be obtained of one frame for every one second of video, and single frames in adjacent seconds may be regarded as adjacent within the scope of the present disclosure, even though they are not temporally contiguous. Any examples discussed herein utilizing temporally contiguous image frames (or temporally contiguous sets of image frames) may utilize image frames (or sets of image frames) that are logically adjacent in any manner. In some instances, the second object state distribution is associated with a state of deviation or a state of non-compliance.

Act 806 of flow diagram 800 includes determining a distance measure between the first object state distribution and the second object state distribution. Act 806 is performed, in some instances, by a system 100 utilizing processor(s) 102, storage 104, I/O system(s) 114, communication system(s) 116, and/or other components.

Act 808 of flow diagram 800 includes assigning a label based upon the distance measure. Act 808 is performed, in some instances, by a system 100 utilizing processor(s) 102, storage 104, I/O system(s) 114, communication system(s) 116, and/or other components. In some implementations, the label is assigned to or in association with (i) the first image set, (ii) one or more subsets of image frames of the first image set, (iii) one or more transitions between subsets of image frames of the first image set, (iv) the second image set, (v) one or more subsets of image frames of the second image set, (vi) one or more transitions between subsets of image frames of the second image set, or (vii) one or more timepoints associated with or based on the first image set or the second image set, or subsets of image frames thereof.

In some instances, the label is assigned to the second image set, and the label comprises a relevance ranking based on the distance measure, where the relevance ranking is inversely related to the distance measure. In some instances, in response to the distance measure satisfying a threshold, the label comprises an indication of a changepoint in the video. In some implementations, act 808 includes computing a plurality of changepoints for the video by comparing distance measures between object state distributions of consecutive sets of one or more video frames of the video.

In some instances, in response to the distance measure satisfying a threshold, the label comprises an indication of a moment of interest in the video, where the moment of interest is representative of a change of state of the subset of one or more objects. In some implementations, act 808 includes computing a plurality of moments of interest for the video by comparing distance measures between object state distributions for the subset of one or more objects of consecutive sets of one or more video frames of the video.

In some instances, in response to the distance measure satisfying the threshold, the label comprises an indication of deviation or non-compliance.

Figure 9:
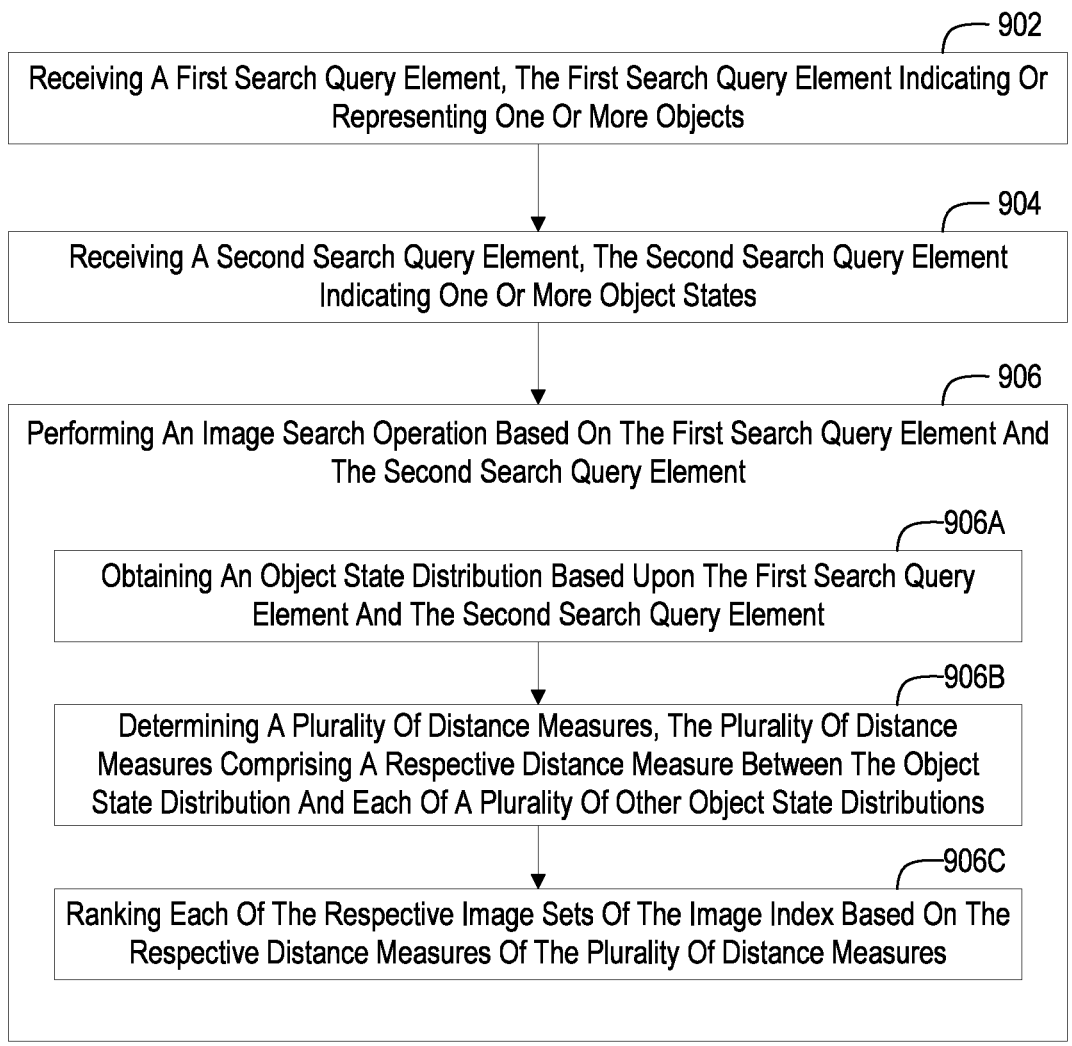
FIG. 9 illustrates an example flow diagram depicting acts associated with facilitating image search using object state distributions.

FIG. 9 illustrates an example flow diagram 900 depicting acts associated with facilitating image search using object state distributions. Act 902 of flow diagram 900 of FIG. 9 includes receiving a first search query element, the first search query element indicating or representing one or more objects. Act 902 is performed, in some instances, by a system 100 utilizing processor(s) 102, storage 104, I/O system(s) 114, communication system(s) 116, and/or other components. In some instances, the first search query element comprises text input indicating the one or more objects. In some instances, the first search query element comprises image input representing the one or more objects. In some instances, the first search query element comprises a user selection of one or more objects represented in a set of one or more images.

Act 904 of flow diagram 900 includes receiving a second search query element, the second search query element indicating one or more object states. Act 904 is performed, in some instances, by a system 100 utilizing processor(s) 102, storage 104, I/O system(s) 114, communication system(s) 116, and/or other components. In some instances, the second search query element comprises text input indicating the one or more object states (or state aspects or types of states that are of interest).

Act 906 of flow diagram 900 includes performing an image search operation based on the first search query element and the second search query element. Act 906 is performed, in some instances, by a system 100 utilizing processor(s) 102, storage 104, object detection module(s) 110, object state description module(s) 112, I/O system(s) 114, communication system(s) 116, and/or other components. In some instances, the image search operation of act 906 includes various sub-acts, which are illustrated in FIG. 9. For example, sub-act 906A may include obtaining an object state distribution based upon the first search query element and the second search query element. Sub-act 906B may include determining a plurality of distance measures, the plurality of distance measures comprising a respective distance measure between the object state distribution and each of a plurality of other object state distributions. Each of the plurality of other object state distributions may be associated with a respective image set of an image index. Sub-act 906C may include ranking each of the respective image sets of the image index based on the respective distance measures of the plurality of distance measures.

Additional Details Related to Implementing the Disclosed Embodiments

The principles disclosed herein may be implemented in various formats. For example, the various techniques discussed herein may be performed as a method that includes various acts for achieving particular results or benefits. In some instances, the techniques discussed herein are represented in computer-executable instructions that may be stored on one or more hardware storage devices. The computer-executable instructions may be executable by one or more processors to carry out (or to configure a system to carry out) the disclosed techniques. In some embodiments, a system may be configured to send the computer-executable instructions to a remote device to configure the remote device for carrying out the disclosed techniques.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. All changes which come within the meaning and range of equivalency of the claims are to be embraced within their scope.

We claim:

1. A system for generating an object state distribution, the system comprising:
   one or more processors; and
   one or more hardware storage devices storing instructions that are executable by the one or more processors to configure the system to:
   receive an image set, the image set comprising one or more images;
   generate a set of object type classifications, the set of object type classifications comprising an object type classification for one or more objects represented in the image set, the set of object type classifications being generated by utilizing the image set as input to one or more object detection modules, the set of object type classifications being based on output of the one or more object detection modules;
   generate a set of object state vectors comprising an object state vector for each object type classification of the set of object type classifications, the set of object state vectors being generated by utilizing (i) the set of object type classifications and (ii) a set of image information based on the image set as input to one or more object state description modules, wherein each object state vector of the set of object state vectors comprises a respective embedding generated by the one or more object state description modules; and
   define an object state distribution, the object state distribution comprising each object state vector of the set of object state vectors for each object type classification of the set of object type classifications.

2. The system of claim 1, wherein the one or more objects for which an object type classification is generated are selected or constrained based on user input.

3. The system of claim 1, wherein the one or more object detection modules include a plurality of object detection modules, the plurality of object detection modules being selected based on user input.

4. The system of claim 1, wherein the one or more object state description modules includes a plurality of object state description modules, the plurality of object state description modules being selected based on an associated object type classification.

5. The system of claim 1, wherein the set of image information used as input to the one or more object state description modules includes object segmentation information for each of the one or more objects represented in the image set.

6. The system of claim 1, wherein the instructions are executable by the one or more processors to configure the system to define a second object state distribution for the image set, wherein the second object state distribution is associated with one or more different objects represented in the image set.

7. The system of claim 1, wherein the instructions are executable by the one or more processors to configure the system to define a separate object state distribution for each of one or more separate images of the image set.

8. The system of claim 1, wherein the instructions are executable by the one or more processors to configure the system to index the set of images using the object state distribution.

9. The system of claim 1, wherein the instructions are executable by the one or more processors to configure the system to compare the object state distribution to another object state distribution associated with a different image set to determine a difference or similarity between the image set and the different image set.

10. The system of claim 1, wherein the image set represents a state of deviation or a state of non-compliance, and wherein the instructions are executable by the one or more processors to configure the system to associate the object state distribution with the state of deviation or the state of non-compliance.

11. A system for generating one or more object state distributions, the system comprising:
one or more processors; and
one or more hardware storage devices storing instructions that are executable by the one or more processors to configure the system to:
present one or more images within a graphical user interface;
receive user input directed to one or more objects represented within the one or more images;
generate a set of object state vectors comprising an object state vector for each of the one or more objects, the set of object state vectors being generated by utilizing (i) a set of object type classifications comprising an object type classification for each of the one or more objects and (ii) a set of image information based on the one or more images as input to one or more object state description modules, wherein each object state vector of the set of object state vectors comprises a respective embedding generated by the one or more object state description modules; and
define an object state distribution for the one or more objects, the object state distribution comprising each object state vector of the set of object state vectors for each of the one or more objects.

12. The system of claim 11, wherein the user input comprises a user selection of the one or more objects represented in a set of one or more images.

13. The system of claim 12, wherein the user input comprises cursor input directed to the one or more objects.

14. The system of claim 11, wherein the set of object type classifications is generated utilizing image data from the one or more images as input to one or more object detection modules, the set of object type classifications being based on output of the one or more object detection modules.

15. The system of claim 14, wherein the image data utilized as input to the one or more object detection modules is based on the user input.

16. The system of claim 15, wherein the user input is directed to one or more segmented representations of the one or more objects represented within the one or more images.

17. The system of claim 16, wherein the one or more segmented representations of the one or more objects are generated based on output of the one or more object detection modules.

18. The system of claim 11, wherein the instructions are executable by the one or more processors to configure the system to compare the object state distribution to another object state distribution associated with a different image set to determine a difference or similarity between the image set and the different image set.

19. A method for generating an object state distribution, the method comprising:
receiving an image set, the image set comprising one or more images;
generating a set of object type classifications, the set of object type classifications comprising an object type classification for one or more objects represented in the image set, the set of object type classifications being generated by utilizing the image set as input to one or more object detection modules, the set of object type classifications being based on output of the one or more object detection modules;
generating a set of object state vectors comprising an object state vector for each object type classification of the set of object type classifications, the set of object state vectors being generated by utilizing (i) the set of object type classifications and (ii) a set of image information based on the image set as input to one or more object state description modules, wherein each object state vector of the set of object state vectors comprises a respective embedding generated by the one or more object state description modules; and
defining an object state distribution, the object state distribution comprising each object state vector of the set of object state vectors for each object type classification of the set of object type classifications.

20. The method of claim 19, wherein the one or more objects for which an object type classification is generated are selected or constrained based on user input.

* * * * *